United States Patent
Newman

(10) Patent No.: US 7,755,637 B2
(45) Date of Patent: Jul. 13, 2010

(54) INITIALIZATION OF COLOR APPEARANCE MODEL

(75) Inventor: Todd D. Newman, Palo Alto, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 385 days.

(21) Appl. No.: 11/486,492

(22) Filed: Jul. 14, 2006

(65) Prior Publication Data

US 2008/0012875 A1 Jan. 17, 2008

(51) Int. Cl.
*G09G 5/02* (2006.01)
(52) U.S. Cl. .................................. 345/589; 345/581
(58) Field of Classification Search ......... 345/589–605; 382/162–167
See application file for complete search history.

(56) References Cited

U.S. PATENT DOCUMENTS

| | | | | |
|---|---|---|---|---|
| 6,603,483 | B1 * | 8/2003 | Newman | 345/593 |
| 6,704,442 | B2 | 3/2004 | Haikin et al. | 382/162 |
| 6,873,434 | B1 | 3/2005 | Kohler et al. | 358/1.9 |
| 6,919,975 | B1 | 7/2005 | Haikin et al. | 358/518 |
| 7,030,888 | B1 * | 4/2006 | Edge et al. | 345/604 |
| RE39,161 | E * | 7/2006 | Edge et al. | |
| 7,382,379 | B1 * | 6/2008 | Edge et al. | 345/600 |
| 2002/0168104 | A1 * | 11/2002 | Muramoto | 382/167 |
| 2004/0017379 | A1 * | 1/2004 | Ajito et al. | 345/600 |
| 2004/0046939 | A1 * | 3/2004 | Nakamura et al. | 353/7 |
| 2005/0024698 | A1 * | 2/2005 | Beyer et al. | 358/527 |
| 2005/0046640 | A1 * | 3/2005 | Newman et al. | 345/589 |
| 2005/0047648 | A1 | 3/2005 | Newman et al. | 382/162 |
| 2005/0047654 | A1 | 3/2005 | Newman et al. | 382/167 |
| 2005/0099427 | A1 * | 5/2005 | Stokes | 345/589 |
| 2005/0134879 | A1 * | 6/2005 | Fuchs et al. | 358/1.9 |
| 2007/0046958 | A1 * | 3/2007 | Hoof et al. | 358/1.9 |
| 2007/0080974 | A1 * | 4/2007 | Edge et al. | 345/589 |
| 2007/0083874 | A1 * | 4/2007 | Vasudevan et al. | 719/328 |
| 2007/0109565 | A1 * | 5/2007 | Presley et al. | 358/1.9 |
| 2007/0216776 | A1 * | 9/2007 | Woolfe | 348/222.1 |

OTHER PUBLICATIONS

Mark D. Fairchild, Color Appearance Models: CIECAM02 and Beyond, IS&T/SID 12th Color Imaging Conference, 2004.*
Nathan Moroney et al., Field Trials of the CIECAM02 Color Appearance Model, Publications-Commission International De L Eclairage CIE, 2003, vol. 153.*
Ingeborg Tastl et al., ICC Color Management and CIECAM02, 13th Color Imaging Conference, 2005.*
CIE Technical Report, "A Colour Appearance Model for Colour Management Systems: CIECAM02", International Commission On Illumination, ISBN: 3-901-906 (2003).
Mark D. Fairchild, "Color Appearance Models", p. 28, First Edition (1998).

* cited by examiner

*Primary Examiner*—Xiao M Wu
*Assistant Examiner*—Charles Tseng
(74) *Attorney, Agent, or Firm*—FItzpatrick, Cella, Harper & Scinto

(57) ABSTRACT

The present invention provides for initializing a color appearance model (CAM) for use in a color management system (CMS), the CMS for performing an imaging task. Initialization parameters for the CAM are determined. The initialization parameters are based on information from a device profile and/or a viewing condition profile. The imaging task determines how the information from the device profile and/or the viewing condition profile is to be used for the initialization parameters. The CAM is initialized using the determined initialization parameters. The initialization parameters for the CAM are likely to result in more accurate transformation of color image data between a source device and a destination device.

11 Claims, 6 Drawing Sheets

TASK 1

CAMP 1

ADOPTED WHITE POINT:
BACKGROUND:
NORMALIZATION:
SURROUND:
LUMINANCE:

TASK 2

CAMP 2

ADOPTED WHITE POINT:
BACKGROUND:
NORMALIZATION:
SURROUND:
LUMINANCE:

TASK N

CAMP N

ADOPTED WHITE POINT:
BACKGROUND:
NORMALIZATION:
SURROUND:
LUMINANCE:

ROUTINE TASKS

SPECIFIC TASKS

PERCEPTUAL MATCH

MEDIA SIMULATION

INITIALIZATION OF COLOR APPEARANCE MODEL

BACKGROUND OF THE INVENTION

1. Field of the Invention

The invention relates to the field of color management systems (CMSs), and more particularly relates to initializing a color appearance model (CAM) for use in a CMS.

2. Description of the Related Art

Color management systems (CMSs) are typically used for transforming color image data from the color space of a source device to the color space of a destination device. In general, component colors of source color data are transformed from a source device's device-dependent color space (e.g., RGB) into values of a device-independent color space (e.g., XYZ). The transformed colors are then modeled using a color appearance model (CAM), which converts from the color values to correlates of perceptual attributes of color, such as hue, chroma, colorfulness, lightness and brightness.

Once the source color data has been modeled using a CAM, inverse transforms can be used for the destination device to determine corresponding destination color data. In particular, the inverse transforms convert values in color appearance space to values in device-independent color space, and then to values in device-dependent color space for the destination device. In this way, color image data from the color space of a source device is transformed to the color space of a destination device.

In instantiating a CAM, it is usually required that certain parameters for the CAM be initialized. The behavior of the CAM depends on the values of the parameters with which it is initialized.

Thus, it is desirable to choose initialization parameters for a CAM which are likely to result in more accurate transformation of color image data between a source device and a destination device.

SUMMARY OF THE INVENTION

According to one aspect of the invention, initialization of a color appearance model (CAM) is performed for use in a color management system (CMS), the CMS for performing an imaging task. Initialization parameters for the CAM are determined. The initialization parameters are based on information from a device profile and/or a viewing condition profile. The imaging task determines how the information from the device profile and/or the viewing condition profile is to be used for the initialization parameters. The CAM is initialized using the determined initialization parameters. The initialization parameters for the CAM are likely to result in more accurate transformation of color image data between a source device and a destination device.

The imaging task can be one of a plurality of imaging tasks, and the viewing condition profile can be a color appearance model profile (CAMP).

Each of the plurality of imaging tasks can be associated with a separate CAMP, and the initialization parameters can be based on information from the CAMP associated with the imaging task. The CAMP can comprise an adopted white point value, a background value, a normalization value, a surround value and a luminance value.

The plurality of imaging tasks can be identified within one or more task profiles, the plurality of imaging tasks can share a CAMP, and the one or more task profiles can determine for each of the plurality of imaging tasks how the information from the device profile and/or the CAMP is used for the initialization parameters. The task profile can comprise an adopted white point value, a normalization value and a D Factor value for each of the plurality of imaging tasks.

The plurality of imaging tasks can comprise routine tasks which share a CAMP and specific tasks which are associated with one or more CAMPs.

The CAMP shared by the routine tasks can comprise an adopted white point set to a reference white point, a background value set to 20% of the reference white point, a surround value set to Average, a luminance value set to viewing an average print or an average display, a D factor set to 1.0, and a Boolean for normalizing to media white point set to true.

The specific tasks can include a perceptual matching task associated with a CAMP, and the CAMP associated with the perceptual matching task can comprise an adopted white point set to a media white point, a background value set to 20% of the media white point, a surround value set to measured or computed, a luminance value set to an adapting field as accurately measured, a D factor set to 1.0, and a Boolean for normalizing to media white point set to true.

The specific tasks can also include a media simulation in a viewing booth task associated with a CAMP, and the CAMP associated with the media simulation in a viewing booth task can comprise an adopted white point set to a reference white point, a background value scaled from the reference white point, a surround value set to Average, a luminance value of an adapting field as measured in the viewing booth, a computed D factor, and a Boolean for normalizing to media white point set to false.

In addition, a CMS for transforming color image data from the color space of a source device to the color space of a destination device is provided for, wherein the CMS uses a CAM to perform the transformation, and wherein the CAM is initialized as described above.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
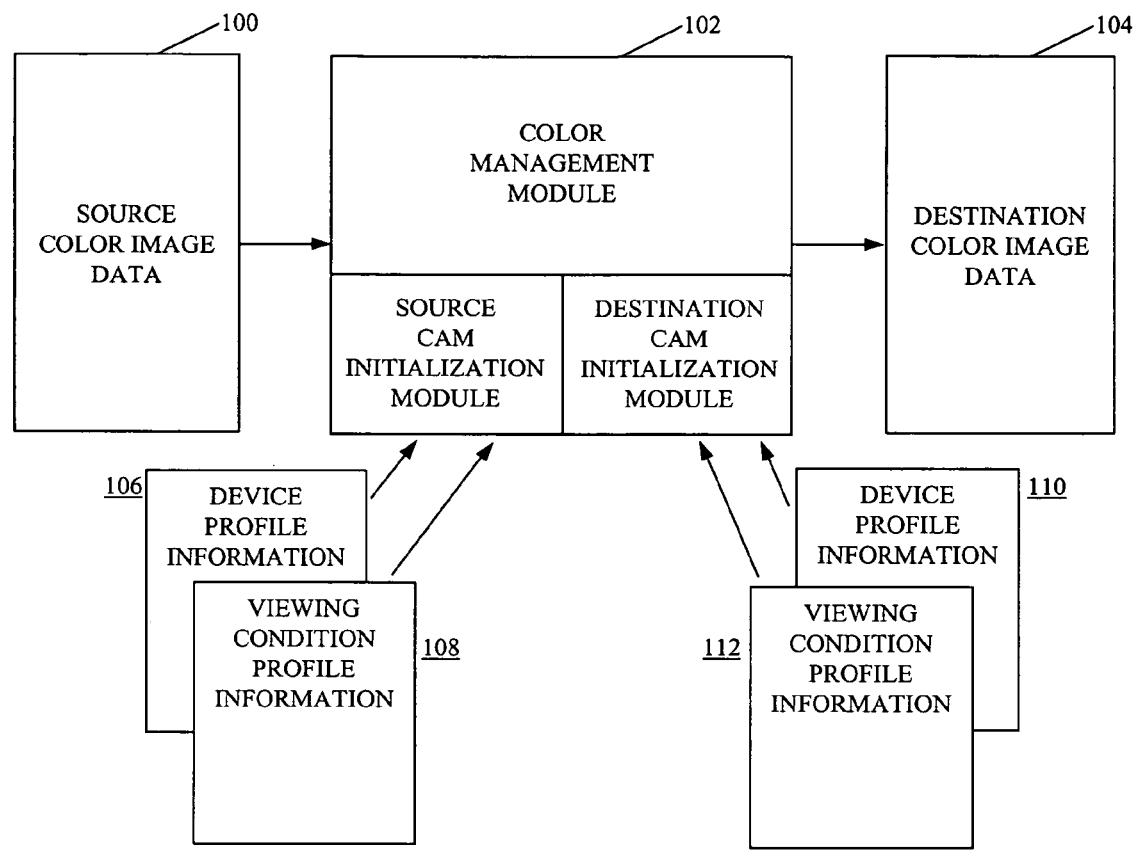
FIG. 1 is a block diagram that provides a general explanation of a color management process in which a color management module uses a source and destination CAM initialization module in accordance with an exemplary embodiment of the invention.

Referring to FIG. 1, a general explanation of a color management process in which a color management module uses a source and destination CAM initialization module in accordance with an exemplary embodiment of the invention, is shown. A source device generates source color image data 100, and a destination device produces destination color image data 104 which corresponds to the generated source color image data 100. A color management module (CMM) 102 is used for transforming from the source color image data 100 to the destination color image data 104, where the transformation is typically associated with an imaging task.

In effecting the transformation, the CMM 102 transforms source color image data 100 from a source device's device-dependent color space (e.g., RGB) to data of a device-independent color space (e.g., XYZ). This data is then modeled using a color appearance model (CAM), which, as noted above, converts values in device-independent color space to correlates of perceptual attributes of color, such as hue, chroma, colorfulness, lightness and brightness.

The CMM then uses inverse transforms to determine corresponding destination color image data 104. In particular, the inverse transform converts values in color appearance space to values in device-independent color space, and then to values in device-dependent color space for the destination device.

As seen in FIG. 1, CMM 102 includes a source CAM initialization module for initializing a source CAM, and a destination CAM initialization module for initializing a destination CAM. The source CAM is a forward model which is initialized with respect to the imaging task and source viewing conditions, and the destination CAM is an inverse model which is initialized with respect to the imaging task and destination viewing conditions.

In this regard, the source CAM initialization module determines initialization parameters for the source CAM based on device profile information 106 of the source device and/or viewing condition profile information 108. The destination CAM initialization module determines initialization parameters for the destination CAM based on device profile information 110 of the destination device and/or viewing condition profile information 112.

Furthermore, the imaging task associated with the transformation from source color image data 100 to destination color image data 104 determines how the device profile information 106 and/or the viewing condition profile information 108 is to be used for the initialization parameters for the source CAM, and how the device profile information 110 and/or the viewing condition profile information 112 is to be used for the initialization parameters for the destination CAM.

The determination of initialization parameters based on the imaging task, and the use of viewing condition profile information and/or device profile information, allow for matrices and look-up tables to be derived which more properly map the colors of source color image data 100 to destination color image data 104. Accordingly, the source and destination CAM initialization modules of this representative embodiment are seen to achieve more accurate transformation of color image data between a source device and a destination device.

Figure 2:
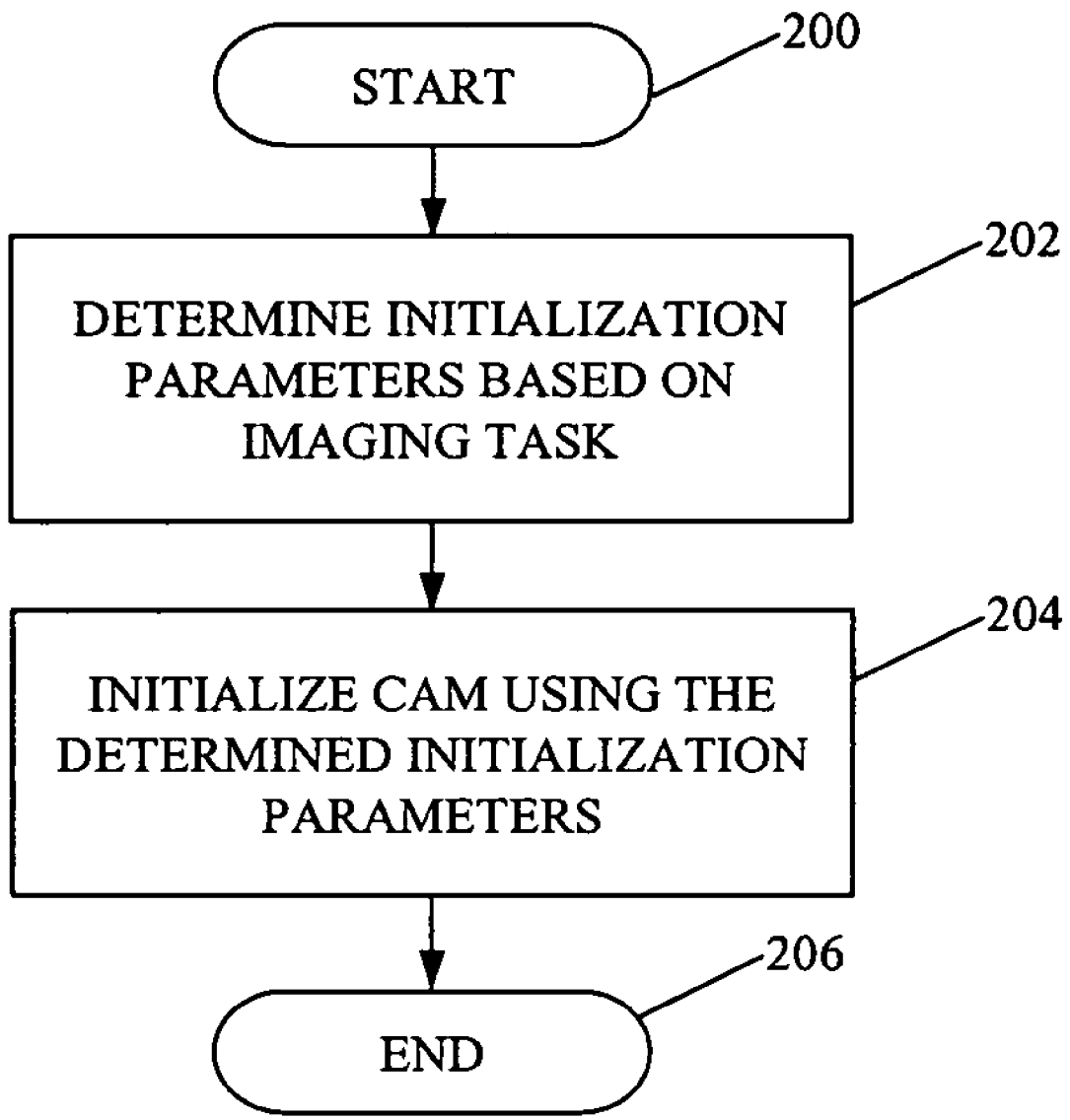
FIG. 2 is a flowchart depicting initialization of a CAM, in accordance with a representative embodiment of the invention.

FIG. 2 is a flowchart depicting initialization of a CAM, in accordance with a representative embodiment of the invention. Following start bubble 200, initialization parameters for a CAM are determined based on an imaging task (block 202).

However, before discussing how the initialization parameters for the CAM are determined, a description of the initialization parameters will be provided.

In CIECAM02, which is a CAM defined in CEE 159:2004, certain parameters must be set in order to initialize the CAM. These parameters include the adopted white point, the background, the surround, and the luminance of adapting field. Traditionally, these values are provided in a color appearance model profile (CAMP).

CIECAM02 is an empirical model of color appearance. In other words, the internal mathematic equations used for CIECAM02 are based on experimental data. In several experiments, users examined color samples and made judgments as to whether the colors match, and the users also made judgments for the magnitude of the lightness and chroma of the samples. Matrices and other mathematical equations were then fit to the experimental data. Because of this fitting process, CIECAM02 is designed to typically work for data within a fixed numerical range. In particular, the CIECAM02 model is designed so that the adopted white point has a luminance (Y) value of 100.0.

In general, CAMPs and device model profiles (DMPs) are measurement-based, with the DMPs containing pairs of device control values (e.g., RGB or CMYK) and tristimulus values (e.g., XYZ). The XYZ values are as reported by the measurement instruments. Some measurement instruments, such as spectrophotometers, produce data that is normalized to a reference white point. For example, when measuring inkjet paper with a spectrophotometer, data can be normalized to CEE D50 (96.42, 100, 82.49), and a media white point (MWP) can be (85.65, 88.92, 76.31). Other instruments, such as telespectroradiometers, produce absolute colorimetric data. For example, the white point of an LCD monitor measured with a telespectroradiometer can be (210.33, 215.39, 239.88).

If the media white point is to be used as the adopted white point for CIECAM02, then the MWP should be normalized, so that its luminance is 100. This can be done by computing a scaling factor of 100/luminanceOfMediaWhite, and then multiplying each of the MWP's XYZ values by the scaling factor. Using the above examples, the normalized value for the paper's MWP is (96.32, 100, 85.81), and the normalized white point for the display is (97.65, 100, 111.37).

It should be noted that if the data value used to initialize the CAM is normalized, it is also necessary to normalize the data values coming out of device models. Otherwise, using the above values, the white point of above LCD display will result in a lightness of 158, which is an unrealistic value.

It is sometimes preferred to consider the paper lightness when normalized to the white point of a perfectly reflecting diffuser (PRD), rather than the media white point. In such a case, the inkjet paper white typically comes out with a lightness of 93.13, when using a normalized PRD under a D50 illuminant.

However, in both cases, the incoming data should be normalized, although the values by which to normalize may be different. One advantage to normalizing is that normalization supports either absolute or relative colorimetric data for both the CAMP and the DMP. This is seen to facilitate developers and users of a CMS, since measurement data can be directly compared with the color management profile data. In this regard, the CMS typically handles all of the normalization.

One consideration in determining initialization parameters for a CAM deals with adopted white points and adapted white points. In this regard, an adopted white point is the computational reference white point used by a CAM. An adapted white point, on the other hand, is the observer or internal human visual system white point resulting from a given viewing condition. The adopted white point may or may not be equivalent to the adapted white point, and one application of an adopted white point is to achieve an optimally reproduced device white. For example, an adopted white point corresponding to a given media may be used in place of an adapted white point, in order than no colorants are used to create a white.

In this regard, the present invention looks beyond available measurement data when initializing a CAM. More particularly, the present invention also considers the imaging task to be accomplished in determining, among other things, when to use the PRD white point and when to use the media white point.

For example, two scenarios for imaging tasks can be considered. The first scenario relates to scanning a photograph and then printing the image on an inkjet printer. The second scenario relates to scanning a photo for reproduction on newsprint and proofing the image on an inkjet paper. In both scenarios, the original photograph and the output image can be viewed in the same lighting environment. However, since the imaging task will now be taken into consideration, the desired parameters for CIECAM02 are likely to be different.

In the first scenario (i.e., photography to print), a user is likely to use a preferred color reproduction, and observers will indicate that the photographic paper looks white and should be reproduced as white on the inkjet paper. However, it is likely that both the photographic paper and the inkjet paper have a different tristimulus (XYZ) measurement from that of a perfectly reflecting diffuser and that both papers also differ from each other. Mentally, an observer will completely adapt first to the photographic paper and then to the inkjet paper. Thus, in a color management system, the photographic paper white point should be used as the CAM adopted white point when computing appearance values from tristimulus values. In addition, the inkjet paper's XYZ measurement is preferred as the adopted white point for initializing the reverse CAM, which converts from appearance space to tristimulus values for output.

In the second scenario, a user is also likely use a preferred reproduction, but this time to render the photograph appropriately for newsprint. When reproducing the (virtual) newsprint image on the inkjet paper, it is preferred to simulate the complete look of the newsprint. As such, instead of reproducing the blank newspaper with blank inkjet paper, the CMS should put ink on the inkjet paper to lower its brightness and to replicate the color cast of the newsprint. Thus, the user is typically not fully adapted the newsprint and the CAM must be initialized accordingly. One way to achieve this is to initialize the CAM to the PRD white point for both the tristimulus to appearance mapping on input and the appearance to tristimulus mapping on output.

Accordingly, the initialization parameters for a CAM can be determined based not only on the measurement data available, but also on the task to be performed. This task information can also be used to determine how to normalize device data.

In CIECAM02, the degree of adaptation, or D factor, is typically determined by the luminance of the adapting field as follows:

$$D = F\left[1 - \left(\frac{1}{3.6}\right)e^{\left(\frac{-(L_A+42)}{92}\right)}\right]$$ (Equation 1)

where F represents a constant which relates to a degree of adaptation, e represents the base of the natural logarithm, and $L_A$ represents the luminance of the adapting field.

The brighter the adapting field, the more fully the observer adapts to the adopted white point. However, as noted above, there may be situations where it can be stated that the observer is completely adapted to the MWP. This may hold true even when viewing a monitor in a dimly lit room (e.g., under sRGB conditions as defined in EEC 61966-2.1) in preparation for a perceptual color match. Because the luminance of the adapting field is low, the D factor will likely be low (approximately 0.87) and thus monitor white will be characterized as having a higher chroma (approximately 2.8) than desired.

Referring back to FIG. 2, and given the above considerations, initialization parameters are determined for the CAM based on the imaging task. The CAM is then initialized using the determined initialization parameters (block 204), and the process ends (end bubble 206). A more detailed description for determining specific values for the initialization parameters will now be provided with reference to FIGS. 3 to 5.

Figure 3:
FIG. 3 is a diagram illustrating how initialization parameters can be determined for a CAM, in accordance with an embodiment of the invention.

FIG. 3 is a diagram illustrating how initialization parameters can determined for a CAM, in accordance with one embodiment of the invention. In this embodiment, each imaging task to be performed has a separate CAMP file associated therewith. Each of the CAMP files contain an adopted white point, a background, an XYZ value for normalization of device values, surround and a luminance of the adapting field. The normalization value will either be the MWP or the CAMPs adopted white point value. In addition, since adopted white point value is already set, the D factor should be set to 1.0, rather than being computed using Equation 1.

This embodiment is seen to provide users with the highest degree of control over the CAM, and it also requires a near one-to-one correspondence between CAMPs and tasks. In general, there is one CAMP for each task as performed under each viewing condition with each device. However, some tasks, like media simulation, do not initialize the CAM with device-dependent data, so the number of CAMPs may be somewhat smaller.

In addition, it is possible to split the CAMP data into task-dependent and task-independent profiles. However, only the surround and luminance of adapting field parameters are seen to be task-independent, so a separate task-dependent profile would still be needed for every task.

Figure 4:
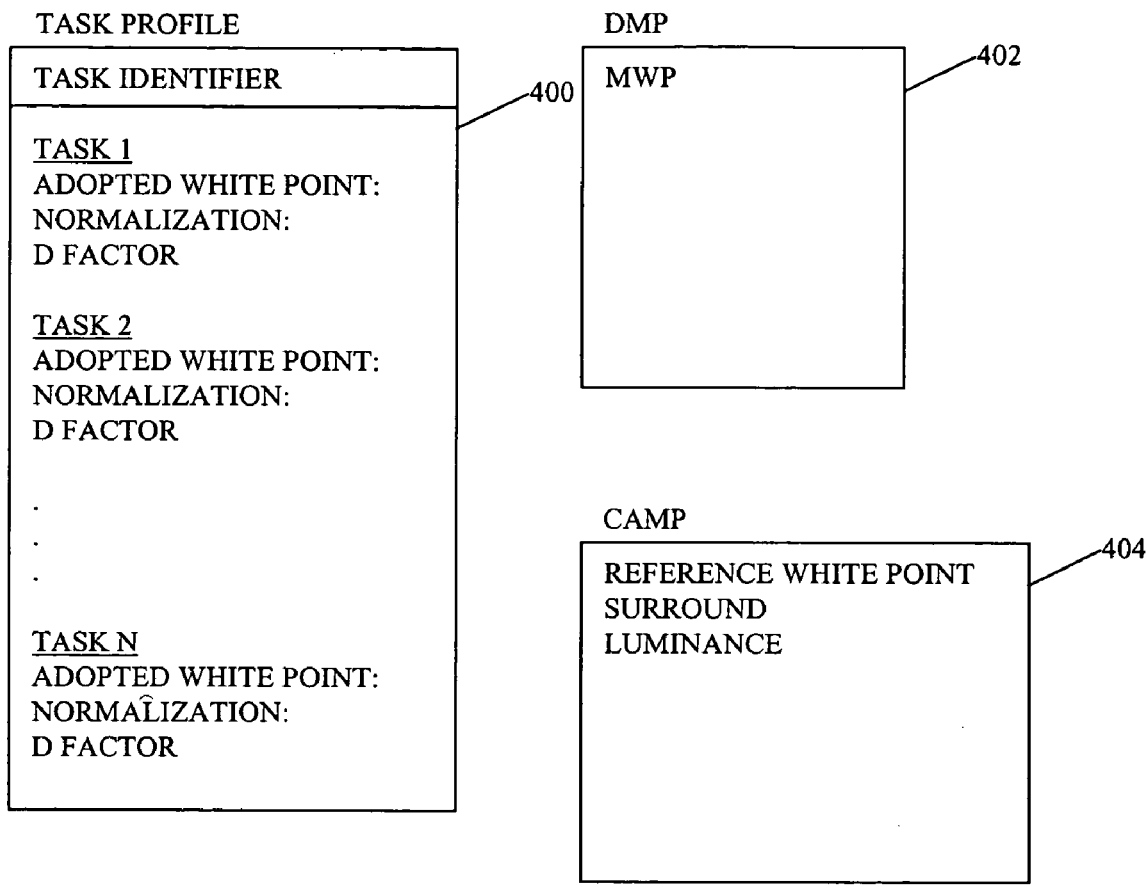
FIG. 4 is a diagram illustrating how initialization parameters can be determined for a CAM, in accordance with another embodiment of the invention.

FIG. 4 is a diagram illustrating how initialization parameters can be determined for a CAM, in accordance with another embodiment of the invention. For this embodiment, it was observed that while there are many possible tasks, there are typically only a few possible parameter values needed for any situation. For example, the adopted white point is either the MVWP or a reference white point, the background value is a fixed percentage of the adopted white point, normalization is either set to the MWP or the reference white point, and the degree of adaptation is either 1.0 or computed by Equation 1. Each task uses a fixed combination of these choices, regardless of the actual measured values.

Accordingly, three files can be used as follows: (1) a DMP file 402, containing among other data the MWP, (2) a CAMP 404, containing the reference white point, surround, and the luminance of the adapting field, and (3) and a task profile 400. The task profile 400 can simply indicate which data to select from the DMP 402 and which to select from the CAMP 404 for a given task.

For example, for a Perceptual Matching task, the task profile 400 can indicate:
  Adopted White Point: DMP
  Normalization: DMP
  D Factor: SetToOne On the other hand, for a Media Simulation task, the task profile 400 can indicate:
  Adopted White Point: CAMP
  Normalization: CAMP
  D Factor: Computed To select a task from within the set of tasks included in the task profile 400, a task identifier parameter can be used. The task identifier can be made a parameter to the CAM initialization routine and choices can be compiled therein. The task parameter can be used to determine selection of CAM initialization parameters from a device profile and a viewing condition profile. For example, some tasks which can be parameterized include reproducing an image as accurately as possible, making a preferred reproduction of the image, and reproducing the image accurately but keeping source whites white.

In an alternative embodiment, a set of task profiles can be developed and shared for all devices and viewing conditions, where each task profile corresponds to one task. Each task profile would have the adopted white point, normalization value and D factor. If separate task profiles are used, then the selection of a task profile would result in the selection of the one task within that task profile.

Because the choice of gamut mapping algorithms is also task dependent (and also typically involves an aesthetic component), the task profile 400 can indicate a preferred gamut mapping method. In addition, the gamut mapping profile and the task profile 400 may be combined. In this situation, each of the task files described above could be subcategorized. For example, a preferred reproduction can be made based on a look associated with a particular vendor (e.g., Vendor A, Vendor B, Vendor C, etc.).

Figure 5:
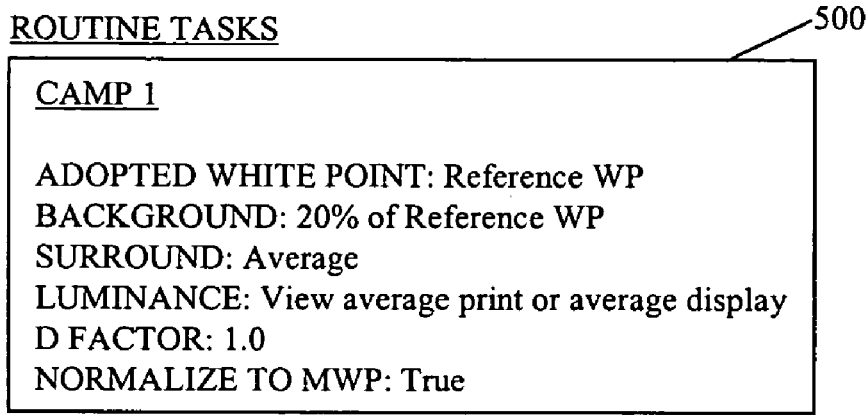
FIG. 5 is a diagram illustrating how initialization parameters can be determined for a CAM, in accordance with yet another embodiment of the invention.
Figure 5:
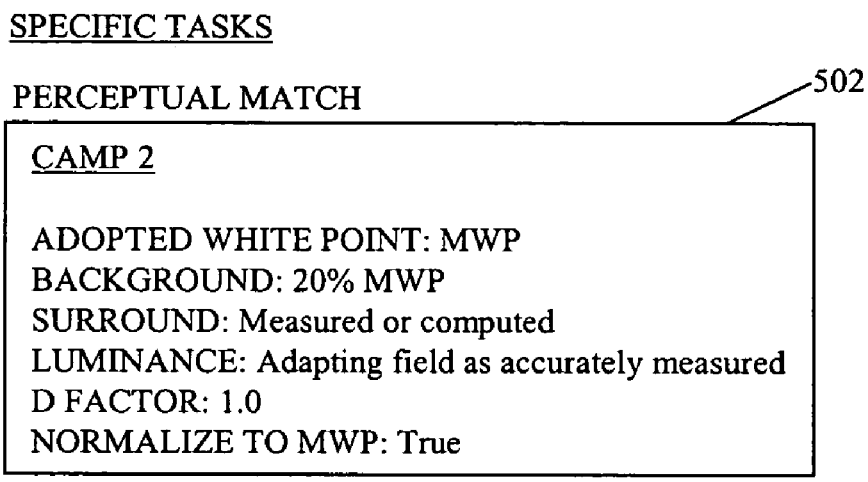
Figure 5:
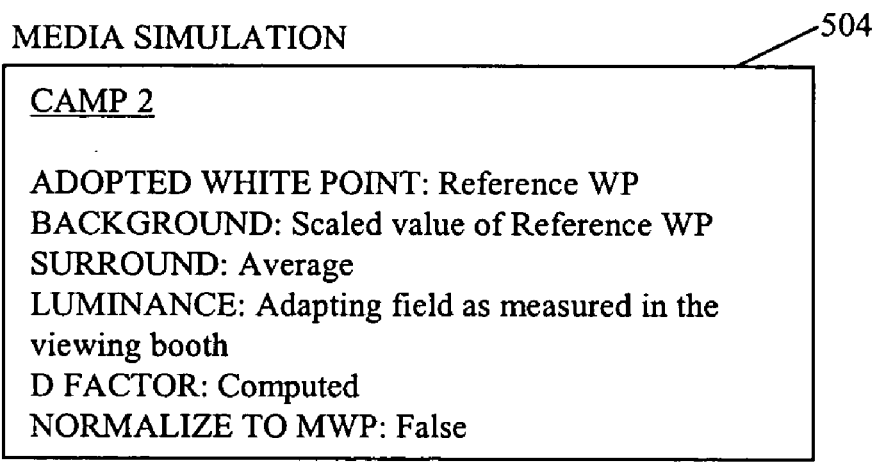

FIG. 5 is a diagram illustrating how initialization parameters can be determined for a CAM, in accordance with yet another embodiment. This embodiment is seen to combine aspects of the embodiments of FIGS. 3 and 4. In the embodiment of FIG. 5, a single CAMP is used for routine tasks, while separate CAMPs can be used for more specific tasks demanding a higher degree of accuracy.

The CAMP file for this embodiment can contain parameters as follows:
  Adopted white point: XYZ
  Background: XYZ
  Surround: categorical or impact of surround
  Luminance of adapting field: in $cd/m^2$
  D factor: float
  NormalizeToMediaWhitePoint: Boolean Using this CAMP format, one CAMP can be used by many users for many routine tasks, but specific CAMPs can be built for tasks demanding a higher degree of accuracy. It should be noted that if a Boolean for normalizing to the MWP (i.e., NormalizeToMediaWhitePoint) is set to False, the input data is normalized to the adopted white point instead of the MWP.

For routine tasks, a CAMP 500 can be set as follows. The adopted white point is preferably set to a reference white point, such as D50 for prints or D65 for displays. The background is preferably scaled to 20% of the reference white point, which matches an average gray background. The surround is preferably set to Average, which typically works well for both prints and displays. The luminance of the adapting field can be set either for viewing an average print or an average display. The D factor is preferably set to 1.0, and NormalizeToMediaWhitePoint is set to True.

The result of setting the parameters as described above is that the image data coming into the CAMP is in the appropriate range (i.e., 0-100) for the CAMP. By setting the D factor to 1.0, at least the reference white point will come out with zero chroma. Empirically, it was observed that the normalized device white has a chroma which is at least low enough for reproduction associated with routine tasks.

Furthermore, because NormalizeToMediaWhitePoint is simply a Boolean value, with the MWP extracted from the DMP, the same CAMP can be used with many different DMPs. If the normalization value is stored in this CAMP, then it would be tied to a specific device.

The CAMP format of this embodiment can also be used for highly accurate color management tasks. Two examples of such tasks are a perceptual match task and a task of media simulation in a viewing booth task. Of course, it should be noted that other highly accurate color management tasks exist, and that appropriate parameters can be selected based on the task.

For perceptual matches, a CAMP 502 can be created with the MWP set as the adopted white point, 20% of the MWP as the background, the surround as measured or computed, the luminance of the adapting field as accurately measured, the D factor as 1.0 and NormalizeToMediaWhitePoint as true. In this case, it should be noted that a separate CAMP is needed for the input and output devices.

For media simulation in a viewing booth, a CAMP 504 can be created with the reference white point as the adopted white point, a background scaled from the reference white point, an Average surround, and a luminance of the adapting field as measured in the light booth. Given how bright light booths typically are, the D value can be computed, and should come out close to 1.0. In addition, NormalizeToMediaWhitePoint is set to False. In this case, the same CAMP file can be used for both the input and output devices.

The embodiment associated with FIG. 5 is seen to provide a good compromise between color quality for critical tasks and minimizing the number of CAMPs to maintain. As noted above, the CAMP format of this embodiment is seen to provide color quality which is acceptable for routine tasks and allows for specifying parameters for highly accurate color management tasks.

Figure 6:
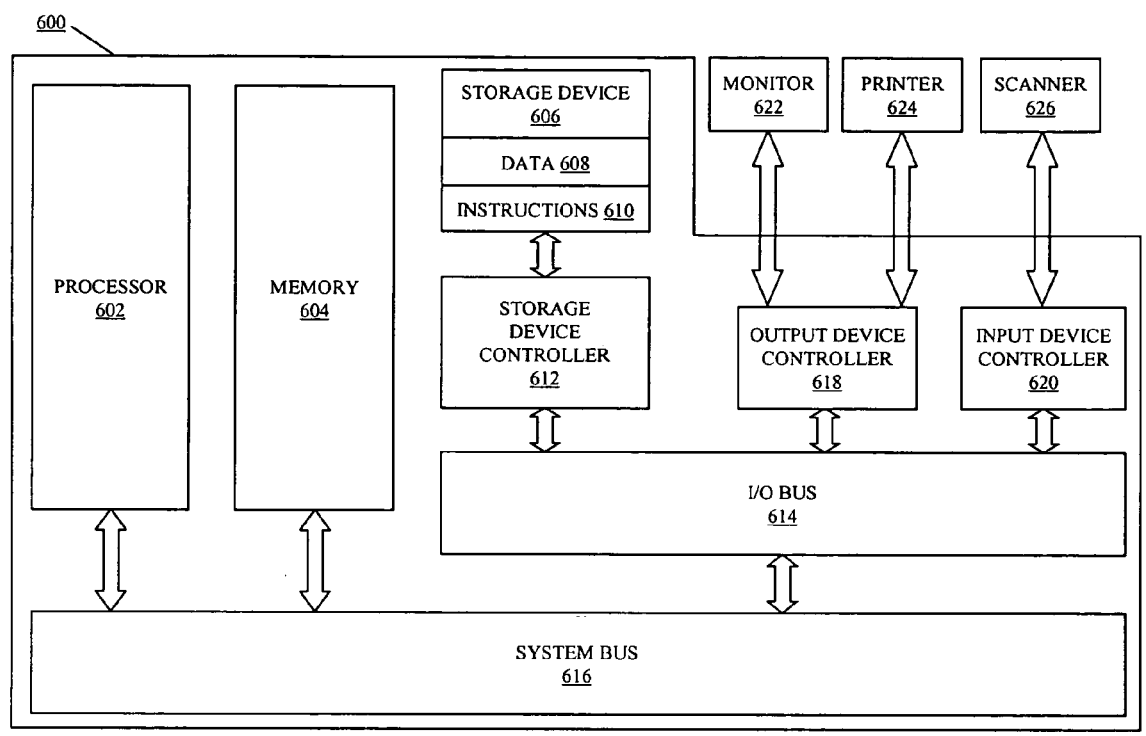
FIG. 6 is an architecture diagram for a data processing apparatus, such as a general purpose computing machine, suitable for hosting a process for initializing a CAM in accordance with a representative embodiment of the present invention.

FIG. 6 is an architecture diagram for a data processing system, such as a general purpose computing machine, suitable for hosting a process for initializing a CAM in accordance with a representative embodiment of the present invention. The data processing system 600 includes a processor 602 coupled to a memory 604 via system bus 616. The processor 602 is also coupled to external Input/Output (I/O) devices via the system bus 616 and an I/O bus 614. A storage device 606 having computer readable storage media is coupled to the processor 602 via a storage device controller 612, the I/O bus 614 and the system bus 616. The storage device 606 is used by the processor 602 to store and read data 608 and computer-executable process steps such as program instructions 610 used to implement initialization of a CAM as described above. The processor 602 may be further coupled to color output devices, such as computer display 622 and color printer 624, via an output device controller 618 coupled to the I/O bus 614. The processor 602 may also be coupled to a color input device 626, such as color scanner, via an input device controller 620.

In operation, the processor 602 loads the computer-executable process steps from the storage device 606 into memory 604. The processor 602 then executes the so-loaded computer-executable process steps to perform initialization of a CAM. The resulting color based on the initialized CAM can be used, for example, by the printer 624, as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for initializing a color appearance model (CAM) for use in a color management system (CMS), the CMS for performing an imaging task, the method comprising the steps of:
    storing a plurality of task profiles, wherein each task profile designates a setting method for setting of an adopted white point for each of a plurality of imaging tasks, and wherein the task profile is different from a device model profile and a viewing condition profile;
    receiving a designation of an imaging task;
    selecting a task profile from the plurality of stored task profiles in accordance with the designated imaging task;
    implementing the setting method designated by the selected task profile so as to determine a value for the adopted white point, by reference to at least one of white point information of the device model profile and white point information of the viewing condition profile; and
    using a processor to initialize the CAM using the value determined for the adopted white point,
    whereby the color management system converts color image data by using the device model profile and the initialized CAM.

2. A method according to claim 1, wherein the viewing condition profile is a color appearance model profile (CAMP).

3. A method according to claim 2, wherein in addition to the adopted white point, the CAMP comprises a background value, a normalization value, a surround value and a luminance value.

4. A method according to claim 1, wherein in addition to the adopted white point, each task profile designates the setting method for a normalization value and a D Factor value for each of the plurality of imaging tasks.

5. A method according to claim 2, wherein the plurality of imaging tasks comprise routine tasks which share a CAMP and specific tasks which are associated with one or more CAMPs.

6. A method according to claim 5, wherein the CAMP shared by the routine tasks comprises an adopted white point set to a reference white point, a background value set to 20% of the reference white point, a surround value set to Average, a luminance value set to viewing an average print or an average display, a D factor set to 1.0, and a Boolean for normalizing to media white point set to true.

7. A method according to claim 5, wherein the specific tasks include a perceptual matching task associated with a CAMP,
    and wherein the CAMP associated with the perceptual matching task comprises an adopted white point set to a media white point, a background value set to 20% of the media white point, a surround value set to measured or computed, a luminance value set to an adapting field as accurately measured, a D factor set to 1.0, and a Boolean for normalizing to media white point set to true.

8. A method according to claim 5, wherein the specific tasks include a media simulation in a viewing booth task associated with a CAMP,
    and wherein the CAMP associated with the media simulation in a viewing booth task comprises an adopted white point set to a reference white point, a background value scaled from the reference white point, a surround value set to Average, a luminance value of an adapting field as measured in the viewing booth, a computed D factor, and a Boolean for normalizing to media white point set to false.

9. A CMS including a processor to transform color image data from the color space of a source device to the color space of a destination device, wherein the CMS uses a CAM to perform said transformation, and wherein the CAM is initialized by a method according to claim 1.

10. Computer-executable process steps stored on a storage device, the computer-executable process steps for initializing a CAM for use in a CMS, the CMS for performing an imaging task, the computer-executable process steps comprising process steps executable to perform a method according to claim 1.

11. An apparatus for initializing a CAM for use in a CMS, the CMS for performing an imaging task, the apparatus comprising:
    a program memory for storing process steps executable to perform a method according to claim 1; and
    a processor for executing the process steps stored in the program memory.

* * * * *